United States Patent
Kosugi

(10) Patent No.: US 11,273,793 B2
(45) Date of Patent: Mar. 15, 2022

(54) SYSTEM FOR PREVENTING UNAUTHORIZED ESTABLISHMENT OF COMMUNICATION, AND METHOD FOR PREVENTING UNAUTHORIZED ESTABLISHMENT OF COMMUNICATION

(71) Applicant: KABUSHIKI KAISHA TOKAI RIKA DENKI SEISAKUSHO, Aichi (JP)

(72) Inventor: Masanori Kosugi, Aichi (JP)

(73) Assignee: KABUSHIKI KAISHA TOKAI RIKA DENKI SEISAKUSHO, Aichi (JP)

(*) Notice: Subject to any disclaimer, the term of this patent is extended or adjusted under 35 U.S.C. 154(b) by 0 days.

(21) Appl. No.: 17/268,247

(22) PCT Filed: Aug. 20, 2019

(86) PCT No.: PCT/JP2019/032428
§ 371 (c)(1),
(2) Date: Feb. 12, 2021

(87) PCT Pub. No.: WO2020/040134
PCT Pub. Date: Feb. 27, 2020

(65) Prior Publication Data
US 2021/0402956 A1 Dec. 30, 2021

(30) Foreign Application Priority Data
Aug. 23, 2018 (JP) .............................. JP2018-156296

(51) Int. Cl.
*B60R 25/24* (2013.01)
*B60R 25/40* (2013.01)

(52) U.S. Cl.
CPC .......... *B60R 25/248* (2013.01); *B60R 25/246* (2013.01); *B60R 25/403* (2013.01)

(58) Field of Classification Search
CPC .... B60R 25/248; B60R 25/246; B60R 25/403
See application file for complete search history.

(56) References Cited

U.S. PATENT DOCUMENTS

| 10,043,223 B2* | 8/2018 | Beardsmore | G07F 15/006 |
| 2016/0225211 A1* | 8/2016 | Gehin | H04L 67/12 |
| 2018/0162321 A1 | 6/2018 | Spiess | |

FOREIGN PATENT DOCUMENTS

| JP | 2011108166 A | * | 6/2011 |
| JP | 2014189158 A | * | 10/2014 |

(Continued)

OTHER PUBLICATIONS

International Search Report issued in International Patent Application No. PCT/JP2019/032428, dated Oct. 8, 2019.

(Continued)

*Primary Examiner* — Nay Tun
(74) *Attorney, Agent, or Firm* — Greenblum & Bernstein, P.L.C.

(57) ABSTRACT

An unauthorized communication establishment prevention system includes a measurement unit arranged in at least one of a terminal and a communication peer. The measurement unit implements an unauthorized communication detection function and obtains a measurement value corresponding to a distance between the terminal and the communication peer. The system further includes a process execution unit that controls initiation, based on a determination result of whether the measurement value is appropriate, of an authentication performed through wireless communication established between the terminal and the communication peer even when the terminal is not operated. The system further includes a monitoring unit that monitors a battery level of the terminal and a suspension unit that suspends the unauthorized communication detection function when the battery level of the terminal is less than a specified amount that is not a battery depletion level.

5 Claims, 4 Drawing Sheets

(56) References Cited

FOREIGN PATENT DOCUMENTS

| | | | |
|---|---|---|---|
| JP | 2014-227647 | 12/2014 | |
| JP | 2016-188014 | 11/2016 | |
| WO | WO-2016031607 A1 * | 3/2016 | ............... H04L 9/32 |

OTHER PUBLICATIONS

Written Opinion of the International Searching Authority issued in International Patent Application No. PCT/JP2019/032428, dated Oct. 8, 2019.

* cited by examiner

SYSTEM FOR PREVENTING UNAUTHORIZED ESTABLISHMENT OF COMMUNICATION, AND METHOD FOR PREVENTING UNAUTHORIZED ESTABLISHMENT OF COMMUNICATION

TECHNICAL FIELD

The present invention relates to an unauthorized communication establishment prevention system and a method for preventing unauthorized establishment of communication.

BACKGROUND ART

In a known distance measurement system, radio communication is established between a terminal and a communication peer to measure the distance between the two devices and determine the appropriateness of the measured distance (refer to Patent Document 1). This type of distance measurement system is being studied for use as an unauthorized communication establishment prevention system that determines whether to validate or invalidate communication based on the determination result of whether the measurement value, which is calculated through radio communication established between two devices, is appropriate. In the unauthorized communication establishment prevention system, for example, a measurement value corresponding to the distance between a terminal and a communication peer is obtained. Then, if the measurement value is appropriate (within predetermined range), ID verification that is performed through wireless communication between the two devices can be accomplished. This allows the communication peer to be operated with the terminal.

Patent Document 1: Japanese Laid-Open Patent Publication No. 2014-227647

SUMMARY

Studies are being conducted to use, for example, the ultra-wide band (UWB) as radio waves that can be used for communication to measure the distance between the terminal and the communication peer. However, the use of UWB radio waves consumes a large amount of electric power and may thus, for example, quickly drain the battery of the terminal. When the battery of the terminal is depleted, authentication communication cannot be established between the terminal and the communication peer. As a result, the communication peer cannot be operated with the terminal. This is inconvenient to the user.

One objective of the present invention is to provide an unauthorized communication establishment prevention system and a method for preventing unauthorized establishment of communication that limits situations in which the user convenience is significantly affected in an adverse manner when the battery level of the terminal is low.

In accordance with an embodiment, an unauthorized communication establishment prevention system is provided to prevent unauthorized establishment of communication between a terminal and a communication peer. The system includes a measurement unit, a process execution unit, a monitoring unit, and a suspension unit. The measurement unit is arranged in at least one of the terminal and the communication peer. The measurement unit implements an unauthorized communication detection function and obtains a measurement value corresponding to a distance between the terminal and the communication peer. The process execution unit controls initiation, based on a determination result of whether the measurement value is appropriate, of an authentication performed through wireless communication established between the terminal and the communication peer even when the terminal is not operated. The monitoring unit monitors a battery level of the terminal. The suspension unit suspends the unauthorized communication detection function when the battery level of the terminal is less than a specified amount that is not a battery depletion level.

With the present configuration, when the battery level of the terminal is less than the specified amount, the unauthorized communication detection function is suspended. Subsequently, the terminal will no longer require power to actuate the unauthorized communication detection function. Further, when the unauthorized communication detection function is suspended, the terminal can still perform authentication with the remaining power. This ensures that the communication peer can be actuated with the terminal. Therefore, the user convenience is not significantly affected in an adverse manner when the battery level of the terminal is low.

In the unauthorized communication establishment prevention system, it is preferred that the authentication performed through wireless communication established between the terminal and the communication peer even when the terminal is not operated be a first authentication. When the unauthorized communication detection function is suspended, instead of the first authentication, the process execution unit subsequently controls initiation of a second authentication, which requires a user to operate the terminal to perform authentication of the terminal. Further, the process execution unit permits actuation of the communication peer with the terminal if the second authentication is accomplished. This configuration allows the communication peer to be actuated with the terminal through the second authentication that differs from the first authentication.

In the unauthorized communication establishment prevention system, it is preferred that the second authentication be performed between the terminal and the communication peer when communication is initiated by the terminal. With this configuration, after the unauthorized communication detection function is suspended, the communication peer can be actuated by performing a simple remote operation with the terminal.

In the unauthorized communication establishment prevention system, it is preferred that the unauthorized communication detection function be a distance measurement function that obtains a measured distance value, which is the distance between the terminal and the communication peer, as the measurement value and determines, from the measured distance value, whether communication is unauthorized. This configuration allows for whether communication is unauthorized to be accurately determined from the measured distance value.

In the unauthorized communication establishment prevention system, it is preferred that suspension of the unauthorized communication detection function be a process that suspends transmitting and receiving of radio waves between the terminal and the communication peer when obtaining the measurement value. With this configuration, the unauthorized communication detection function can be suspended by a simple process that stops the transmission of radio waves for obtaining the measurement value.

In accordance with another embodiment, a method for preventing unauthorized establishment of communication is provided. The method includes implementing an unauthorized communication detection function through communication established between a terminal and a communication peer to obtain a measurement value corresponding to the distance between the terminal and the communication peer; determining whether the measurement value is appropriate to determine whether unauthorized communication is being established; controlling initiation, based on a determination result of whether unauthorized communication is being established, of a first authentication performed between the terminal and the communication peer when communication is initiated by the communication peer; monitoring a battery level of the terminal; and when the battery level of the terminal is less than a specified amount that is not a battery depletion level, suspending the unauthorized communication detection function and subsequently permitting actuation of the communication peer with the terminal upon accomplishment of a second authentication that requires a user to operate the terminal for authentication of the terminal instead of the first authentication.

The present invention limits situations in which the user convenience is significantly affected in an adverse manner when the battery level of the terminal is low.

DESCRIPTION OF THE EMBODIMENTS

An embodiment of an unauthorized communication establishment prevention system and a method for preventing unauthorized establishment of communication will now be described with reference to FIGS. 1 to 6.

Figure 1:
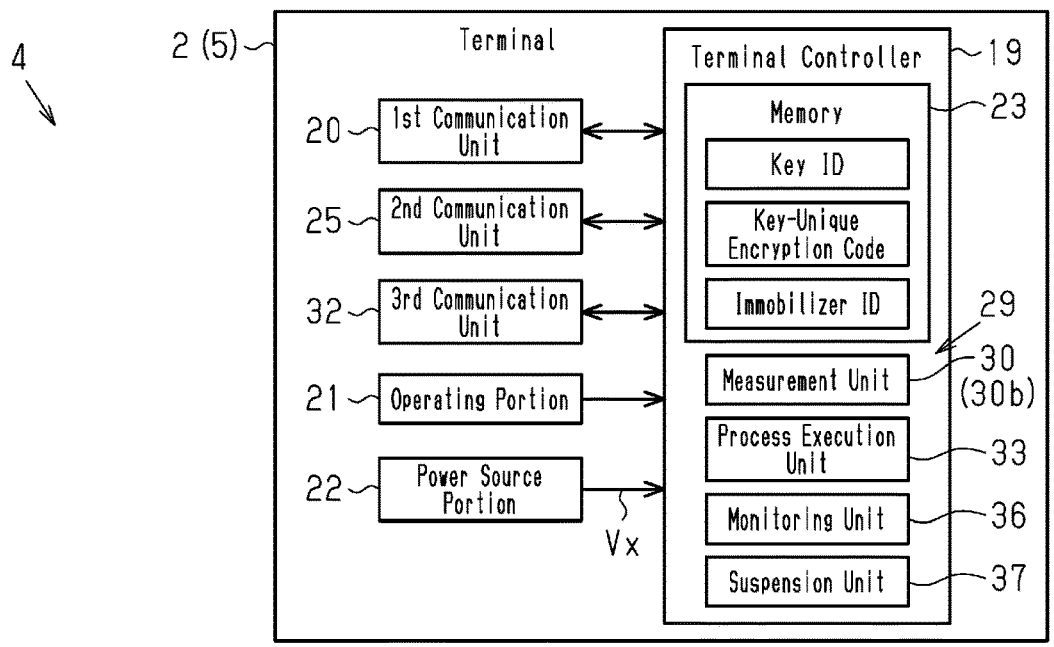
FIG. 1 is a schematic diagram of an unauthorized communication establishment prevention system in accordance with an embodiment.
Figure 1:
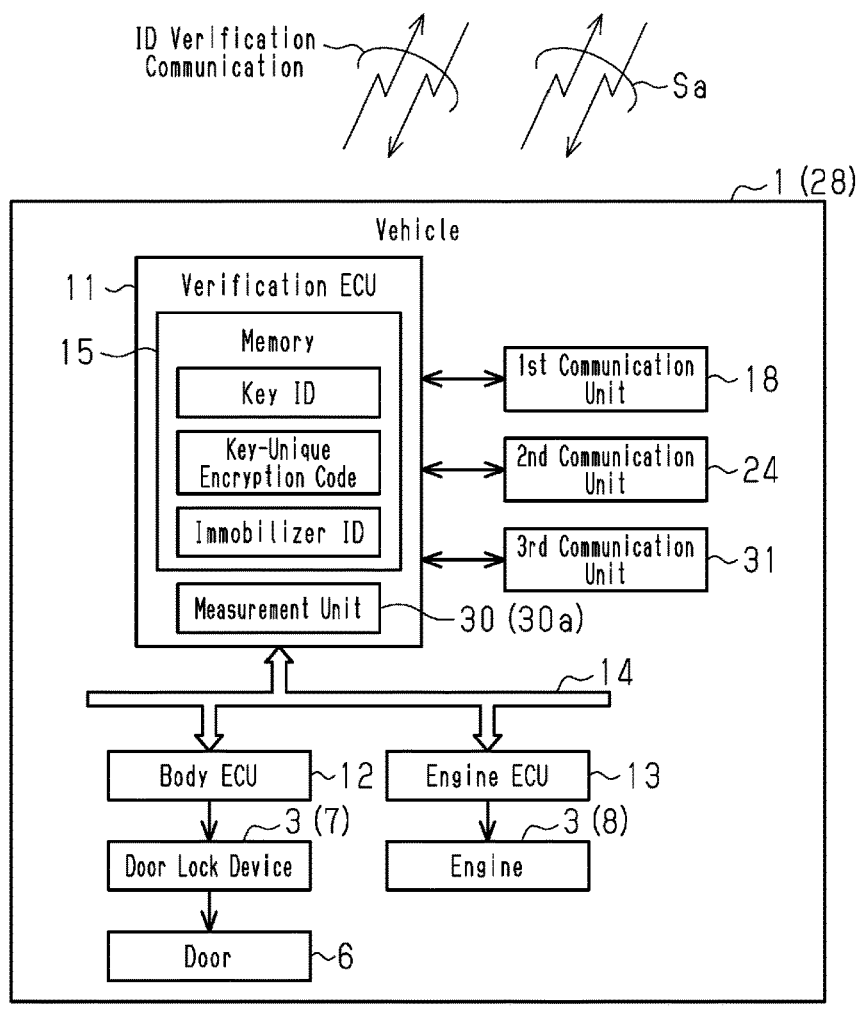

As illustrated in FIG. 1, a vehicle 1 serves as a communication peer 28 that establishes communication with a terminal 2 through wireless communication. In the present example, the terminal 2 is an electronic key 5 including a key function for controlling the vehicle 1. The vehicle 1 and the electronic key 5 form an electronic key system 4 that authenticates the terminal 2 to allow actuation of an on-board device 3. The electronic key system 4 of the present example includes a smart verification system and a wireless key system. In the smart verification system, ID verification (smart verification) is performed through wireless communication when communication is initiated by the vehicle 1. In the wireless key system, ID verification (wireless verification) is performed through wireless communication when communication is initiated by the terminal 2. The on-board device 3 includes, for example, an engine 8 of the vehicle 1 and a door lock device 7 that controls locking and unlocking of a door 6.

The vehicle 1 includes a verification electronic control unit (ECU) 11, a body ECU 12, and an engine ECU 13. The verification ECU 11 performs ID verification. The body ECU 12 manages a power supply of vehicle on-board electric components. The engine ECU 13 controls the engine 8. The ECUs 11 to 13 are connected by communication lines 14 in the vehicle 1. The communication lines 14 are, for example, a Controller Area Network (CAN) and/or a Local Interconnect Network (LIN). A key ID of the terminal 2, which is registered to the vehicle 1, and a key-unique encryption code, which is used for authentication when ID verification is performed, are registered to a memory 15 of the verification ECU 11. The body ECU 12 controls the door lock device 7 that locks and unlocks the door 6.

The vehicle 1 includes a first communication unit 18 that establishes communication with the terminal 2 for ID verification. For example, when the communication performed by the electronic key system 4 (smart verification system) is bidirectional communication using low frequency (LF)-ultra high frequency (UHF), the first communication unit 18 includes a radio wave transmitter that transmits LF radio waves and a radio wave receiver that receives UHF radio waves. Preferably, the radio wave transmitter includes, for example, an exterior transmitter that transmits radio waves to the terminal 2 when it is located outside the vehicle 1 and an interior transmitter that transmits radio waves to the terminal 2 when it is located inside the vehicle 1.

The terminal 2 includes a terminal controller 19, a first communication unit 20, an operating portion 21, a power source portion 22. The terminal controller 19 controls the terminal 2. The first communication unit 20 establishes communication with the vehicle 1 for ID verification. The operating portion 21 is operated to actuate the vehicle 1 with the terminal 2 through the wireless key system. The power source portion 22 supplies the terminal 2 with electric power. The terminal controller 19 includes a memory 23 to which the above-described key ID and key-unique encryption code is written and stored. When the communication performed by the electronic key system 4 (smart verification system) is LF-UHF bidirectional communication, the first communication unit 20 includes a reception unit that receives LF radio waves and a transmission unit that transmits UHF radio waves. The operating portion 21 includes, for example, a lock button that is operated to lock the door 6 and an unlock button that is operated to unlock the door 6.

When the terminal 2 receives a WAKE signal that is periodically or nonperiodically transmitted from the first communication unit 18 of the vehicle 1 on LF radio waves, the terminal 2 is activated from a standby state and transmits an ACK signal (acknowledgement signal) on UHF radio waves. When the verification ECU 11 receives the ACK signal transmitted from the terminal 2 in response to the WAKE signal, the verification ECU 11 starts the smart verification. When the terminal 2 receives the WAKE signal from the exterior transmitter, the verification ECU 11 performs exterior smart verification with the terminal 2 that is located outside the vehicle 1. Further, when the terminal 2 receives the WAKE signal from the interior transmitter, the verification ECU 11 performs interior smart verification with the terminal 2 that is located inside the vehicle 1. The smart verification includes, for example, key ID verification or code authentication. The key ID verification checks the key ID that is registered to the terminal 2. The code authentication uses the key-unique encryption code. In the present example, the code authentication is a challenge-response authentication. Challenge-response authentication calculates a response code with both of the vehicle 1 and the terminal 2 from a challenge code that is a random number and checks whether the response codes match.

When the operating portion 21 is operated, the terminal 2 transmits a wireless signal Swl (refer to FIG. 5) corresponding to the operating portion 21 from the first communication unit 20 on UHF radio waves. The wireless signal Swl includes the key ID of the terminal 2 and a command that corresponds to the operation of the operating portion 21. When the verification ECU 11 receives the wireless signal Swl transmitted from the terminal 2, the verification ECU 11 performs ID verification (wireless verification) by checking the key ID included in the wireless signal Swl. If the ID verification is accomplished, the verification ECU 11 actuates the vehicle 1 (locks door or unlocks door) in accordance with the command in the wireless signal Swl.

The electronic key system 4 includes an immobilizer system, in which ID verification (immobilizer verification) is performed between the vehicle 1 and the terminal 2, for example, through near-range wireless communication. The immobilizer system allows ID verification (immobilizer verification) to be performed through communication established with the vehicle 1 even when the battery of the terminal 2 is depleted. In the immobilizer system, radio frequency identification (RFID) is used as near-range wireless communication. In this case, the vehicle 1 includes a second communication unit 24 used for near-range wireless communication, and the terminal 2 includes a second communication unit 25 used for near-range wireless communication.

If the terminal 2 is held near the second communication unit 24 of the vehicle 1 when the second communication unit 24 transmits drive radio waves through near-range wireless communication, immobilizer verification is started between the vehicle 1 and the terminal 2. In this case, the terminal 2 is actuated and powered by the drive radio waves from the vehicle 1, and the terminal 2 transmits an immobilizer ID, which is registered to the memory 23, to the vehicle 1. When the verification ECU 11 receives the immobilizer ID from the terminal 2 through near-range wireless communication, the verification ECU 11 performs immobilizer verification based on the immobilizer ID. If the verification is accomplished, the verification ECU 11 permits actuation (for example, engine starting operation) of the vehicle 1.

The vehicle 1 has an unauthorized communication detection function (unauthorized communication establishment prevention system 29). The unauthorized communication detection function obtains a measurement value Dx that corresponds to the distance between the terminal 2 and the communication peer 28 (vehicle 1 in the present example) and switches the result of authentication (smart verification in the present example) based on the appropriateness of the measurement value Dx. The unauthorized communication establishment prevention system 29 is arranged in the vehicle 1 to counter acts that would lead to unauthorized accomplishment of smart verification when, for example, a relay or the like is used to connect and establish communication between the vehicle 1 and the terminal 2, which is located far from the vehicle 1.

The unauthorized communication establishment prevention system 29 includes a measurement unit 30. The measurement unit 30 establishes communication between the vehicle 1 and the terminal 2 to implement the unauthorized communication detection function and obtain the measurement value Dx corresponding to the distance between the vehicle 1 and the terminal 2. The measurement unit 30 may be arranged in at least one of the vehicle 1 and the terminal 2. In the present example, the vehicle 1 and the terminal 2 each include the measurement unit 30. In this case, the measurement unit 30 includes a vehicle-side measurement unit 30a (hereafter, measurement unit 30a) that is arranged in the vehicle 1 and a terminal-side measurement unit 30b (hereafter, measurement unit 30b) that is arranged in the terminal 2. Further, the vehicle 1 includes a third communication unit 31 for distance measurement, and the terminal 2 includes a third communication unit 32 used to measure distance. The third communication units 31 and 32 transmit and receive radio waves on the ultra-wideband (UWB). The measurement unit 30 transfers a UWB radio wave Sa between the vehicle 1 and the terminal 2 and calculates a propagation time of the UWB radio wave Sa. From the propagation time, the measurement unit 30 calculates the measurement value Dx corresponding to the distance between the vehicle 1 and the terminal 2. In the present example, the measurement value Dx is a measured distance value corresponding to the distance between the vehicle 1 and the terminal 2. Further, the unauthorized communication detection function is a distance measurement function that obtains the distance between the vehicle 1 and the terminal 2 and determines the authenticity of the communication based on the distance.

Figure 2:
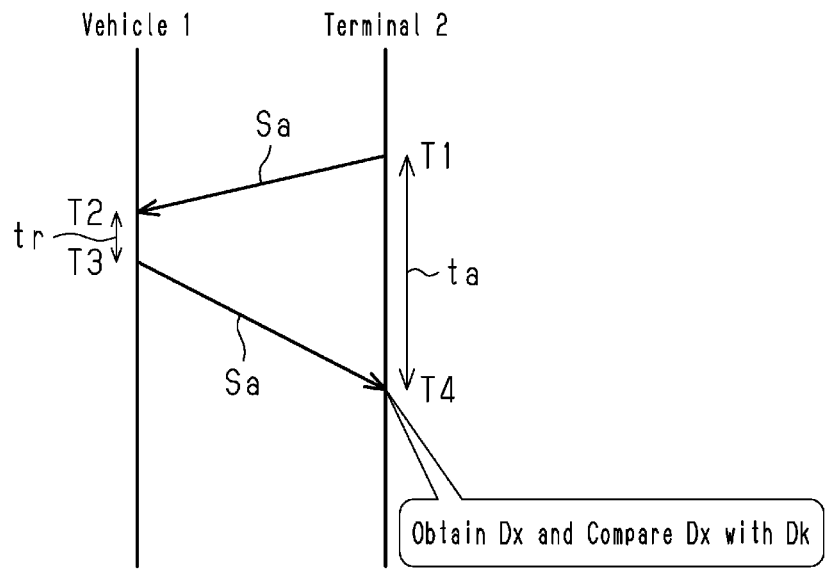
FIG. 2 is a time-sequence diagram of an unauthorized communication detection function.

As illustrated in FIG. 2, at a time point at which distance measurement is started (time T1), the measurement unit 30b of the terminal 2 transmits a UWB radio wave Sa from the third communication unit 32. When the third communication unit 31 receives the UWB radio wave Sa transmitted from the terminal 2 (time T2), the measurement unit 30a of the vehicle 1 returns the UWB radio wave Sa from the third communication unit 31 (time T3). Then, the measurement unit 30b of the terminal 2 receives the UWB radio wave Sa transmitted from the vehicle 1 with the third communication unit 32 (time T4).

The measurement unit 30b calculates a time length tp from time T1 to time T2. Then, the measurement unit 30b calculates the measurement value Dx corresponding to the distance between the vehicle 1 and the terminal 2 from the time length tp. The time length tp is obtained from the following equation (1), and the measurement value Dx corresponding to the distance is obtained from the following equation (2).

$$tp=(ta-tr)/2 \qquad (1)$$

$$Dx=tp\times 3\times 10^8 \qquad (2)$$

Here, "ta" in equation (1) is obtained with a timer or the like that measures the time length from when the terminal 2 transmits the UWB radio wave Sa to when the terminal 2 receives the UWB radio wave Sa that is returned from the vehicle 1. Further, "tr" in equation (1) is obtained with a timer or the like that measures the time length from when the vehicle 1 receives the UWB radio wave Sa transmitted from the terminal 2 to when the vehicle 1 returns the UWB radio wave Sa.

As illustrated in FIG. 1, the unauthorized communication establishment prevention system 29 includes a process execution unit 33 that controls initiation of authentication performed through wireless communication between the vehicle 1 and the terminal 2 based on a determination result of whether the measurement value Dx is appropriate. The process execution unit 33 is arranged in the terminal controller 19 of the terminal 2. In the present example, the process execution unit 33 performs authentication (smart verification in the present example) between the vehicle 1 and the terminal 2 even when the terminal 2 is not operated as a first authentication. The process execution unit 33 controls initiation of the first authentication based on the determination result of whether the measurement value Dx is appropriate. If the calculated measurement value Dx is less than a specified value Dk, that is, if the measured distance value is appropriate, the process execution unit 33 determines that unauthorized communication is not being established. In this case, the process execution unit 33 executes a process that allows smart verification to be accomplished. If the calculated measurement value Dx is greater than or equal to the specified value Dk, that is, if the measured distance value is not appropriate, the process execution unit 33 determines that unauthorized communication is being established. In this case, the process execution unit 33 executes a process that does not allow smart verification to be accomplished.

In order to improve the user convenience, the unauthorized communication establishment prevention system 29 includes a measurement function proactive suspension function that suspends the unauthorized communication detection function when the state of charge of the power source portion 22 in the terminal 2 is low. Since UWB communication consumes a large amount of power, for example, sudden battery depletion may occur in the power source portion 22 of the terminal 2. In this case, the terminal 2 cannot be actuated to operate the vehicle 1. In this respect, in the present example, when the battery level of the power source portion 22 is decreased to a certain level, the unauthorized communication detection function, which consumes a large amount of power to perform UWB communication, is proactively suspended to limit power consumption of the terminal 2. When the unauthorized communication detection function is suspended, the determination of whether the measurement value Dx is appropriate is not performed, and smart verification cannot be accomplished. This prompts the user to recognize that the battery level of the terminal 2 is low. Further, after the unauthorized communication detection function is suspended, the process execution unit 33 (terminal controller 19) controls initiation of a second authentication instead of the first authentication. The second authentication requires the user to operate the terminal 2 for authentication of the terminal 2. For example, the second authentication may be wireless verification that uses wireless communication (wireless signal Swl) and/or immobilizer verification that uses near-range wireless communication. When initiation of the second authentication is permitted, the vehicle 1 can be operated. In this manner, although there are restrictions, the vehicle 1 will be operable with the terminal 2 if the second authentication is accomplished. This improves the user convenience.

The unauthorized communication establishment prevention system 29 includes a monitoring unit 36 that monitors the battery level Vx of the terminal 2. The monitoring unit 36 is arranged in the terminal controller 19 of the terminal 2. The monitoring unit 36 of the present example detects the voltage of the power source portion 22, which is arranged in the terminal 2, to monitor the battery level Vx of the terminal 2.

The unauthorized communication establishment prevention system 29 includes a suspension unit 37 that suspends the unauthorized communication detection function when the battery level Vx of the terminal 2 is less than specified amount Vk. The suspension unit 37 is arranged in the terminal controller 19 of the terminal 2. The suspension of the unauthorized communication detection function may be any process that does not validate the determination result of whether the communication is unauthorized. When the battery level Vx of the terminal 2 is less than the specified amount Vk, the suspension unit 37 suspends the unauthorized communication detection function. As a result, the verification ECU 11 subsequently permits operation of the vehicle 1 with the terminal 2 upon accomplishment of the second authentication (wireless verification and/or immobilizer verification in the present example), which requires the user to operate the terminal 2 for authentication of the terminal 2 is accomplished, instead of the first authentication (smart verification in the present example).

The operation of the unauthorized communication establishment prevention system 29 in accordance with the present embodiment will now be described with reference to FIGS. 3 to 6.

Figure 3:
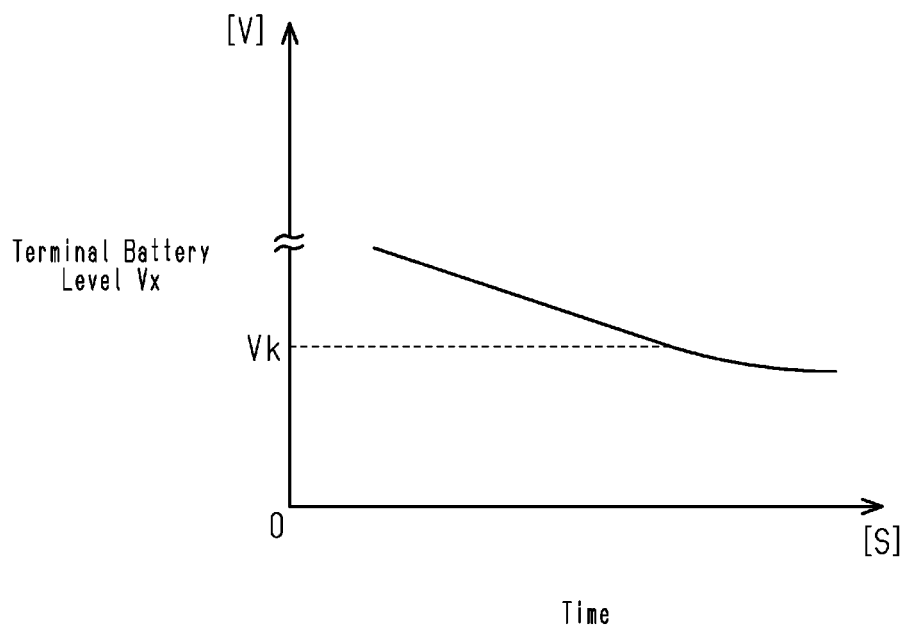
FIG. 3 is a waveform diagram illustrating changes in the battery level of a terminal.

As illustrated in FIG. 3, the monitoring unit 36 continuously monitors the battery level Vx of the power source portion 22 of the terminal 2. The battery level Vx is the voltage of the power source portion 22. In the present example, the monitoring unit 36 monitors whether the battery level Vx is less than the specified amount Vk. Preferably, the specified amount Vk is set to, for example, a value that allows the terminal 2 to establish communication with the vehicle 1 a predetermined number of times in the wireless key system. The monitoring unit 36 outputs the monitoring result of whether the battery level Vx is less than the specified amount Vk to the suspension unit 37.

Figure 4:
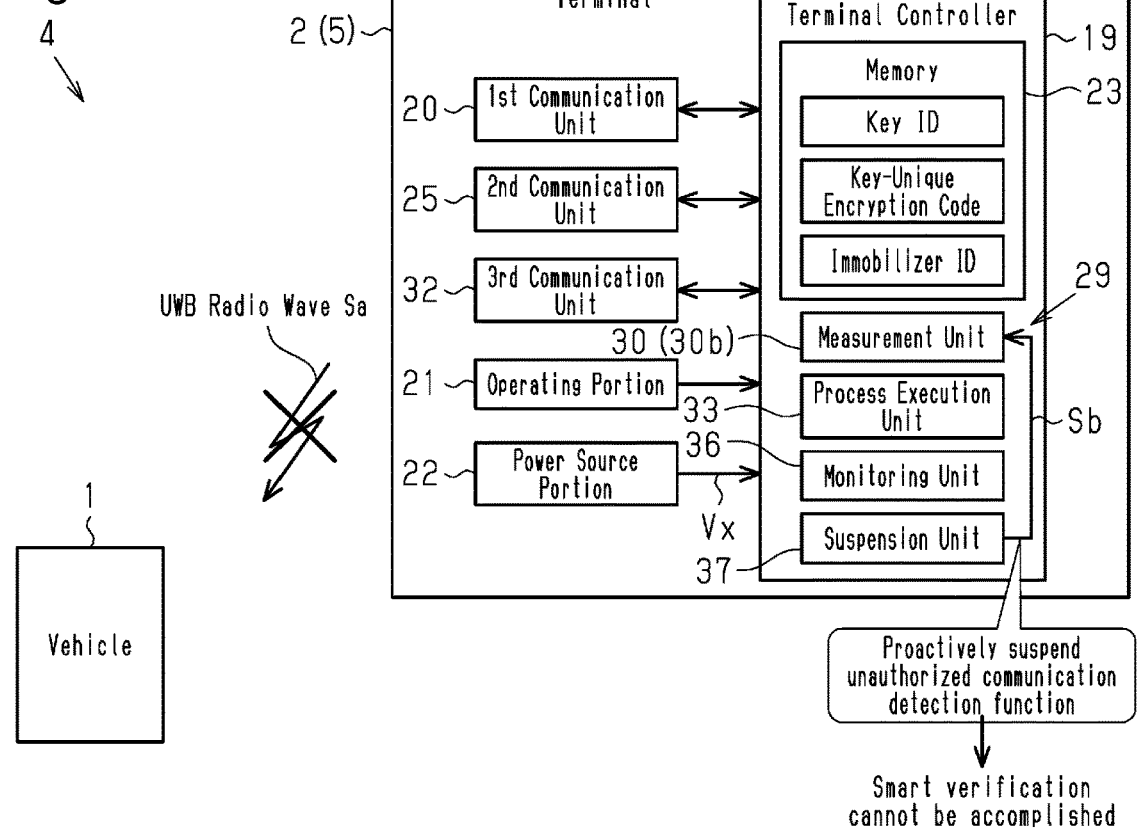
FIG. 4 is a diagram illustrating proactive suspension of an unauthorized communication detection function.

As illustrated in FIG. 4, when the suspension unit 37 detects that the battery level Vx is less than the specified amount Vk from the monitoring result of the monitoring unit 36, the suspension unit 37 suspends the unauthorized communication detection function. In the present example, the suspension unit 37 outputs a function suspension request Sb to the measurement unit 30b to request communication of the UWB radio wave Sa to be stopped. When the function suspension request Sb is received, the measurement unit 30b forcibly suspends the unauthorized communication detection function. In the present example, when the function suspension request Sb is received, the measurement unit 30b enters a state in which it does not transmit the UWB radio wave Sa. Accordingly, the measurement unit 30b is shifted to a state in which distance measurement is not performed. As a result, the measurement unit 30b will not start distance measurement even at a time point at which distance measurement is to be started. When the unauthorized communication detection function is suspended, the terminal 2 will not need to transmit UWB radio wave Sa. This decreases power consumption of the power source portion 22.

When the unauthorized communication detection function is suspended, even if the terminal 2 is an authentic key that can accomplish smart verification, the time length tp will be "co" because the unauthorized communication detection function is not implemented. Thus, appropriateness of the distance between the terminal 2 and the vehicle 1 will not be determined. Therefore, the process execution unit 33 will not receive the determination result from the measurement unit 30, and smart verification will thus not be accomplished. In this case, even though the user is carrying the authentic terminal 2, the user cannot lock/unlock the door 6 of the vehicle 1 or start the engine 8.

Figure 5:
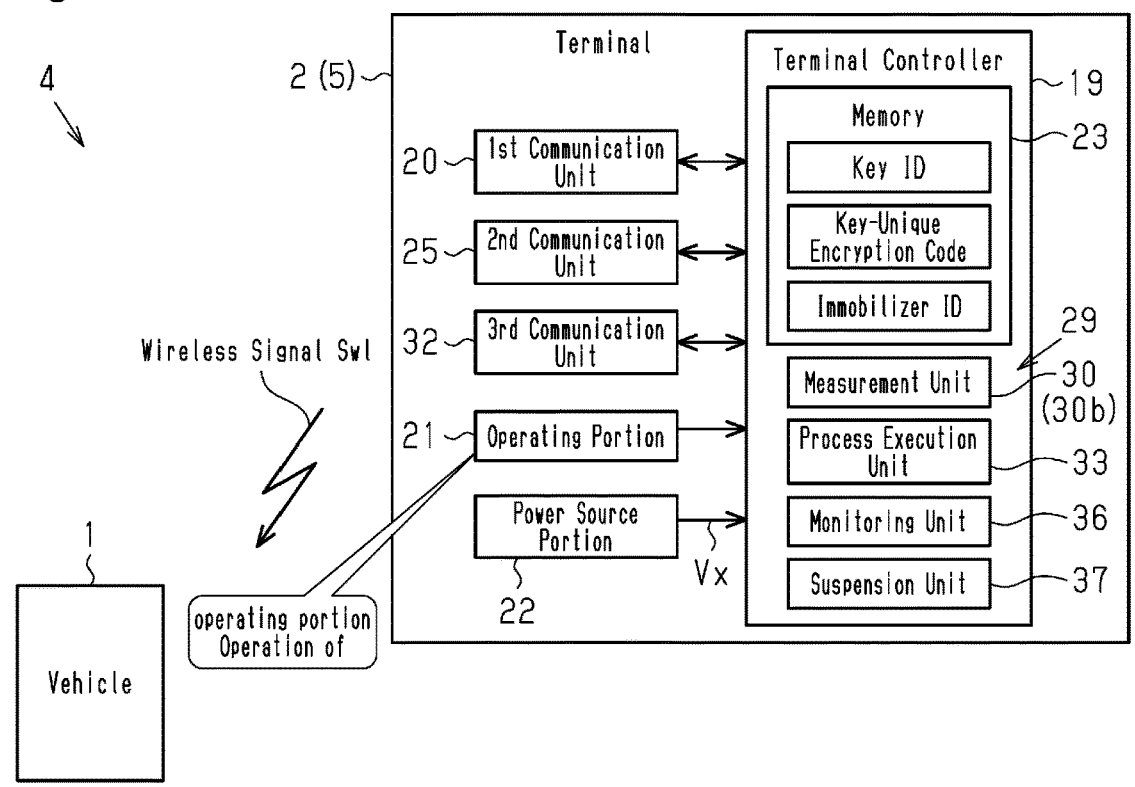
FIG. 5 is a diagram illustrating a wireless operation.

In this case, as illustrated in FIG. 5, the wireless key system can be used for communication between the terminal 2 and the vehicle 1 to perform the second authentication instead of the smart verification (first authentication). For example, the user operates the operating portion 21 (lock button or unlock button) of the terminal 2 to lock or unlock the door 6 of the vehicle 1. When the operating portion 21 is operated, the terminal 2 transmits a wireless signal Swl, which corresponds to the operation of the operating portion 21, from the first communication unit 20 on UHF radio waves. When the first communication unit 18 receives the wireless signal Swl transmitted from the terminal 2, the verification ECU 11 obtains the key ID from the wireless signal Swl and performs ID verification (wireless verification). If the ID verification is accomplished, the verification ECU 11 permits or executes locking or unlocking of the door 6 with the body ECU 12.

In this manner, in the wireless verification, the determination of whether to allow accomplishment of wireless verification is not associated with the determination result of the unauthorized communication detection function. That is, the determination of whether to allow accomplishment of the wireless verification is determined regardless of the unauthorized communication detection function. In the wireless key system, the user consciously operates the terminal 2 (performs remote operation with operating portion 21). Thus, in any case, there will be no effect when the unauthorized communication detection function is suspended in the wireless key system.

Figure 6:
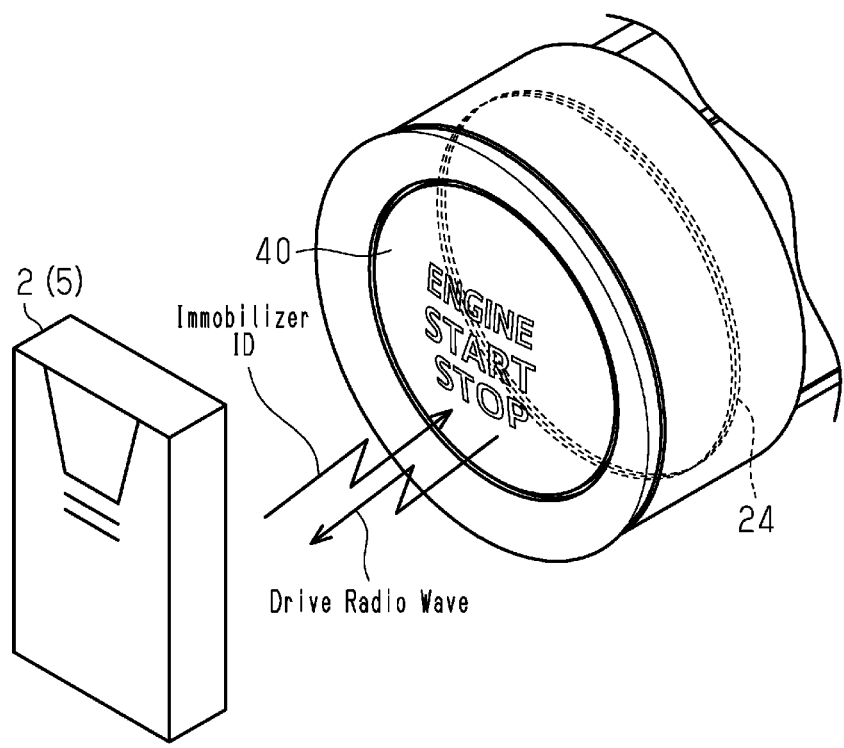
FIG. 6 is a schematic diagram of a holding operation.

Further, as illustrated in FIG. 6, when the unauthorized communication detection function is suspended, the immobilizer system can be used to perform the second authentication in place of the first authentication. For example, the user holds the terminal 2 near an engine switch 40 that is located near the driver seat inside the vehicle 1 to start the engine 8. The second communication unit 24 of the vehicle 1 is arranged in the engine switch 40 so that near-range wireless communication is established between the second communication unit 24 and the terminal 2. When the terminal 2 receives drive radio waves transmitted from the second communication unit 24 of the vehicle 1, the terminal 2 is actuated and powered by the drive radio waves to transmit the registered immobilizer ID from the second communication unit 25. The verification ECU 11 performs ID verification (immobilizer verification) based on the immobilizer ID received from the terminal 2. If the ID verification is accomplished, the verification ECU 11 permits starting of the engine with the engine switch 40.

In the immobilizer system, the determination of whether to allow accomplishment of immobilizer verification is not associated with the determination result of the unauthorized communication detection function. That is, the determination of whether to allow accomplishment of immobilizer verification is determined regardless of the unauthorized communication detection function. In the immobilizer system, the user consciously operates the terminal 2 (holding operation of terminal 2). Thus, in any case, there will be no effect when the unauthorized communication detection function is suspended in the immobilizer system.

The unauthorized communication establishment prevention system 29 of the present embodiment has the following advantages.

(1) In the present example, when the battery level Vx of the terminal 2 is less than the specified amount Vk, the suspension unit 37 suspends the unauthorized communication detection function. Thus, the terminal 2 will no longer need power to implement the unauthorized communication detection function. Further, when the unauthorized communication detection function is suspended, there is enough power remaining in the terminal 2 to perform the second authentication (wireless verification and the like). This ensures that the vehicle 1 can be operated with the terminal 2. Thus, user convenience is not significantly affected in an adverse manner when the battery level of the terminal 2 is low.

When the battery level Vx of the terminal 2 is less than the specified amount Vk, for example, smart communication (LF-UHF communication) may be suspended to prevent unauthorized establishment of communication using a relay or the like. However, this method requires improvements to the specification of the existing electronic key system and is thus not realistic. In contrast, in the present example, when the battery level Vx of the terminal 2 is less than the specified amount Vk, the unauthorized communication detection function is suspended so that smart verification will not be accomplished. This prevents unauthorized establishment of communication. In this manner, the present example provides security against the establishment of unauthorized communication without the need for improvements to the specification of the existing system.

(2) When the unauthorized communication detection function is suspended, control is subsequently executed to perform the second authentication (wireless verification and the like), which is initiated when the user operates the terminal 2 to authenticate the terminal 2, instead of the first authentication (smart verification). Then, the vehicle 1 is permitted to be operated with the terminal 2 if the second authentication is accomplished. Thus, the vehicle 1 can be operated with the terminal 2 through the second authentication, which differs from the first authentication.

(3) The second authentication (wireless verification present example) is performed between the vehicle 1 and the terminal 2 when communication is initiated by the terminal 2. Thus, after the unauthorized communication detection function is suspended, the vehicle 1 can be actuated by a simple remote-operation of the vehicle 1 with the terminal 2.

(4) The unauthorized communication detection function is a distance measurement function that obtains the measured distance value, which corresponds to the distance between the vehicle 1 and the terminal D2, as the measurement value x and determines, from the measured distance value, whether communication is unauthorized. This allows whether communication is unauthorized to be accurately determined from the measured distance value.

(5) Suspension of the unauthorized communication detection function is a process performed to stop the transmission of radio waves (UWB radio wave Sa) between the terminal 2 and the vehicle 1 to obtain the measurement value Dx. This allows the unauthorized communication detection function to be suspended by simply not transmitting UWB radio wave Sa, which is used to obtain the measurement value Dx.

The above embodiment may be modified as described below. The above embodiment and the following modifications can be combined as long as the combined modifications remain technically consistent with each other.

The unauthorized communication detection function does not have to determine the appropriateness of communication by obtaining a measured distance value based on propagation time of radio waves. For example, a received signal strength indicator (RSSI) of radio waves may be measured to determine whether communication is unauthorized from the RSSI value. In this manner, the unauthorized communication detection function may have various modes besides the distance measurement that uses propagation time of radio waves.

In each embodiment, for example, an antenna may be arranged on both the vehicle 1 and the terminal 2, and only one of the vehicle 1 and the terminal 2 may include the measurement unit 30. This construction is employed when distance is measured, for example, with the RSSI.

In each embodiment, the measurement unit 30 and an antenna may be arranged on only one of the vehicle 1 and the terminal 2. This construction is employed when, for example, only one of the vehicle 1 and the terminal 2 includes an antenna to obtain the measurement value Dx from reflected waves.

The control for initiating the first authentication (smart verification) is not limited to the control that determines whether to allow accomplishment of the smart communication and may be changed to any of other various controls. For example, when unauthorized communication is determined, smart communication may be interrupted.

The proactive suspension of the unauthorized communication detection function is not limited to a mode that stops the transmission of UWB radio wave Sa. For example, even if distance measurement is performed, the unauthorized communication detection function may be suspended by a mode that invalidates the determination result.

The proactive suspension of the unauthorized communication detection function may be any process that does not validate the determination result of the unauthorized communication detection function.

The distance does not have to be measured by transmitting and receiving the UWB radio wave Sa, and other radio frequencies may be used.

The monitoring unit 36 does not have to monitor the battery level Vx of the power source portion 22. For example, the monitoring unit 36 may measure the number of times communication is performed or how long communication is established with the terminal 2 and suspend the unauthorized communication detection function when the measured value reaches an upper limit.

The power source portion 22 is not limited to a battery (including secondary cell) and only needs to be a power source of the terminal 2.

The vehicle 1 and the terminal 2 may establish communication that uses various types of radio frequencies or communication protocols.

In each embodiment, the smart verification system may have a mode in which the terminal 2 transmits WAKE signals.

The smart verification system does not have to include both the interior LF antenna and the exterior LF antenna. For example, LF antennas may be arranged on left and right sides of the vehicle body, and the location of the electronic key 5 may be determined based on the combination of responses from the electronic key 5 to the LF radio waves transmitted from the LF antennas.

In each embodiment, the electronic key system 4 is not limited to the smart verification system and only needs to check the correctness of the terminal 2.

The first authentication is not limited to the smart verification and only needs to check for a valid set of the terminal 2 and the communication peer 28.

The second authentication is not limited to the wireless verification or the immobilizer verification and may only require a user operation.

The terminal 2 is not limited to the electronic key 5 and may be changed to another terminal such as a high-performance mobile phone or the like.

The communication peer 28 is not limited to the vehicle 1 and may be changed to various types of devices or apparatus.

The invention claimed is:

1. An unauthorized communication establishment prevention system that prevents unauthorized establishment of communication between a terminal and a communication peer, the system comprising:
a measurement unit arranged in at least one of the terminal and the communication peer, wherein the measurement unit implements an unauthorized communication detection function and obtains a measurement value corresponding to a distance between the terminal and the communication peer;
a process execution unit that controls initiation, based on a determination result of whether the measurement value is appropriate, of an authentication performed through wireless communication established between the terminal and the communication peer even when the terminal is not operated;
a monitoring unit that monitors a battery level of the terminal; and
a suspension unit that suspends the unauthorized communication detection function when the battery level of the terminal is less than a specified amount that is not a battery depletion level.

2. The system according to claim 1, wherein
the authentication that is performed through wireless communication established between the terminal and the communication peer even when the terminal is not operated is a first authentication, and
when the unauthorized communication detection function is suspended, instead of the first authentication, the process execution unit subsequently controls initiation of a second authentication, which requires a user to operate the terminal to perform authentication of the terminal, and permits actuation of the communication peer with the terminal if the second authentication is accomplished.

3. The system according to claim 2, wherein the second authentication is performed between the terminal and the communication peer when communication is initiated by the terminal.

4. The system according to claim 1, wherein the unauthorized communication detection function is a distance measurement function that obtains a measured distance value, which is the distance between the terminal and the communication peer, as the measurement value and determines, from the measured distance value, whether communication is unauthorized.

5. A method for preventing unauthorized establishment of communication, the method comprising:
implementing an unauthorized communication detection function through communication established between a terminal and a communication peer to obtain a measurement value corresponding to the distance between the terminal and the communication peer;
determining whether the measurement value is appropriate to determine whether unauthorized communication is being established;
controlling initiation, based on a determination result of whether unauthorized communication is being established, of a first authentication performed between the terminal and the communication peer when communication is initiated by the communication peer;
monitoring a battery level of the terminal; and
when the battery level of the terminal is less than a specified amount that is not a battery depletion level, suspending the unauthorized communication detection function and subsequently permitting actuation of the communication peer with the terminal upon accomplishment of a second authentication that requires a user to operate the terminal for authentication of the terminal instead of the first authentication.

* * * * *